United States Patent [19]

Templin et al.

[11] Patent Number: 5,781,550

[45] Date of Patent: Jul. 14, 1998

[54] TRANSPARENT AND SECURE NETWORK GATEWAY

[75] Inventors: Fred L. Templin, Los Altos; Ajay Gupta; Gregory D. Skinner, both of Mountain View, all of Calif.; Dermot Matthew Tynan, Galway, Ireland

[73] Assignee: Digital Equipment Corporation, Maynard, Mass.

[21] Appl. No.: 594,632

[22] Filed: Feb. 2, 1996

[51] Int. Cl.$^6$ .................................. H04L 12/56
[52] U.S. Cl. .......................... 370/401; 395/187.01
[58] Field of Search ............................ 370/401–405, 370/475, 389, 392, 902, 903, 915, 315; 395/187.01, 186, 200.02, 200.06, 200.12, 200.14, 200.16, 200.17, 200.55, 200.57, 200.58, 200.59, 200.66, 200.67, 200.75

[56] References Cited

U.S. PATENT DOCUMENTS

| 5,229,988 | 7/1993 | Marbaker et al. | 370/13 |
|---|---|---|---|
| 5,303,303 | 4/1994 | White | 380/49 |
| 5,442,633 | 8/1995 | Perkins et al. | 370/94.1 |
| 5,548,646 | 8/1996 | Aziz | 380/23 |
| 5,550,984 | 8/1996 | Gelb | 395/200.17 |
| 5,623,601 | 4/1997 | Vu | 395/187.01 |
| 5,657,452 | 8/1997 | Kralowetz | 395/200.57 |

OTHER PUBLICATIONS

Bellovin & Chesick, "Ntework Firewalls," IEEE Communications Mag., vol. 32, No. 9, pp. 50–57, Sep. 1994.

Primary Examiner—Douglas W. Olms
Assistant Examiner—Matthew C. Phillips
Attorney, Agent, or Firm—Dirk Brinkman

[57] ABSTRACT

In a computer implemented method, packets are transparently and securely communicated between a trusted computer and an untrusted computer connected by a gateway. Each packet including a source address, a destination address and a payload. The gateway, according to rules stored in a configuration database, intercepts a packet received in an Internet protocol layer of the gateway. The packet has a source address of the trusted computer, a destination address of the untrusted computer and a first payload. The intercepted packet is diverted to a proxy server operating in an application protocol layer of the gateway. The intercepted packet is consumed by the proxy server, and the proxy server generates a second packet having a source address of the gateway and the destination address of the untrusted computer and the first payload. The second packet is sent to the untrusted computer to enable the trusted computer to communicate with the untrusted computer securely.

15 Claims, 5 Drawing Sheets

7,781,550

TRANSPARENT AND SECURE NETWORK GATEWAY

FIELD OF THE INVENTION

This invention relates generally to computer communications using routing networks, and more particularly to securely forwarding information through a public access network such as the Internet.

BACKGROUND OF THE INVENTION

In the Internet, gateways are used to interconnect networks hosting computers. The purpose of a gateway is to route data and control information among the host computers during "sessions." The data and control information can be organized into cells, packets, datagrams, or messages, depending on a communications protocol layer. In general, the term "packets" will be used hereinafter to denote any packaged information. A session is a period in time during which a communications exchange takes place across the network between end-points, e.g., hosts executing client and server software programs exchanging the data and control information. Computers originating a session assume a client role, while computers responding to communications requests assume the server role.

The gateway processes the packets according to routing information and protocol conventions encapsulated in headers of the packets. During operation, the gateway makes decisions on how packets traverse the gateway from an input side to an output side.

The Internet uses a communications protocol suite called Transmission Control Protocol—Internet Protocol (TCP/IP), for example, see *Internetworking With TCP/IP, Volume I*, Douglas E. Comer, Prentice Hall 1991. Conceptually, TCP/IP is organized as a stack having layers of processing protocols. The protocol stack includes user/application, transport (TCP/UDP), network/Internet (IP), and data link layers. The data link layer sends and receives the packets via input/output interfaces and physical network layers specific to particular implementations.

Again, ignoring the distinction between packets, datagrams, and messages, the packets pass through the protocol layers depending on addresses. The addresses can assume various forms, depending on the processing layer. At the lowest levels, physical addresses are used to directly communicate information between end-points. At higher levels of the protocol stack, an Internet (IP) address is used for control. The IP address is a 32 bit logical address that uniquely identifies a network and an end-point host identification number of a computer. Host address information may also include information about the specific physical input/output (I/O) interfaces of the computer.

Applications use host names, for example, "altavista.digital.com," to pinpoint computers where data are stored. Applications can obtain host name to IP address translations from specialized computers executing Domain Name Servers (DNS), connected to the Internet. The IP address includes a prefix "netid," and a postfix "hostid." For the purpose of establishing a session and sending packets via the Internet, IP address to physical address binding is accomplished with an address resolution protocol (ARP).

The ARP works as follows. A host A that wants to resolve an IP address $I_c$ of a host C broadcasts the address $I_c$ over the locally attached network using a specialized request control packet. As a courtesy, the Host C, in response to seeing its IP address $I_c$, replies its physical address $P_c$. Host A can subsequently use the physical address $P_c$ to communicate directly with Host C.

Recall that gateways interconnect networks. Therefore, "local" computers sharing the same network address, e.g., hosts having the same "netid," can directly send and receive packets with each other without passing through a gateway using the physical addresses established by the ARP. However, packets communicated between hosts not sharing the same "netid" must traverse a gateway.

It is recognized that traditional Internet gateways are prone to security attacks. For example, in traditional gateways, no provisions are made to exclude undesirable packets. Such packets may contain instructions to damage or access sensitive information. As was explained above, the Internet addresses of networks and computers, no matter where they are located, may be readily available.

These reasons have compelled developers to build secure gateways. The purpose of a secure gateway is to control access to information stored in "trusted" computers on networks on the "inside" of the gateway by "untrusted" computers on networks "outside" the gateway.

In a first type of secure gateway, a screening technique is used to exclude undesirable packets. Here, typically at the IP forwarding boundary, procedures are invoked to filter suspect packets. The screening procedures operate according to a set of predetermined decision rules based on, for example, IP addresses and transport layer protocol information of the packets. Packets which do not violate the rules are allowed to traverse the gateway, unacceptable packets are rejected.

By design, such packet screening gateways do not authenticate users on behalf of whom packets are forwarded, since forwarding is on a per-packet, rather than on a per-session basis. Also, packet screening gateways make no attempt to conceal private network addresses. This information is advertised to all networks connected by the gateway as described above. Packet screening provides transparent gateway traversal, but security is relatively weak. The security is only as good as the rules. The rules may be insufficient, or the rules may be subverted by attacks such as IP spoofing. Spoofing can include the altering of address information of packets to fool the gateway. These design deficiencies potentially pose serious security threats.

In a second type of secure gateway, a proxy server at the application layer acts as a visible "middleman" between trusted and untrusted environments during a session. In this model, a session can only be established after end-user authentication. Authentication can be accomplished by having the client explicitly exchange unique and privileged security information with the proxy server. Once the client is authenticated, the gateway allows the trusted client computer to open a secure communications session with an untrusted server computer.

In order to establish a prior art proxy session, a trusted host A must know the address of the gateway B. Furthermore, the host A must overtly notify the gateway B that it wants to communicate with a remote untrusted host C. During the session, the host A generates packets having a source address of A and a destination address of the gateway B. The proxy server of the gateway B forwards packets have a source address B, and a destination address C, e.g., the remote host. Thus, the existence of host A is not revealed.

Packets on the reverse path are similarly handled by the proxy server. The untrusted host C sends packets to proxy server of the gateway B. The gateway B forwards packets having a source address of B and a destination address of A.

Thus, in prior art secure gateways, untrusted portions of the network do not have direct access to trusted portions of the network. This form of session proxying provides strong security once a session is established, since client authentication is on a per session basis. However, such a session is non-transparent because the establishment of the session requires a two-phased addressing operation on the part of the client. Since users need to know how to connect through the gateway, this creates an additional complexity for the client.

Therefore, there is a need for a gateway which provides strong security, as well as transparent operation.

SUMMARY OF THE INVENTION

The invention provides for a computer implemented method and apparatus for communicating packets between a trusted computer and an untrusted computer connected by a gateway. Each of the plurality of packets includes a source address, a destination address and a payload. The source address indicates the point of origination of the packet, and the destination address indicates where the packet should be sent.

The gateway receives a packet having a source address of the trusted computer, a destination address, and a first payload. The packet, according to rules stored in a configuration database, is intercepted and diverted to a proxy server of the gateway if the destination address references an untrusted computer. The proxy server extracts the payload from the packet, and generates a new packet having a source address of the gateway, the destination address of the untrusted computer, and the payload. As an advantage of the invention, this enables the trusted computer to securely communicate with the untrusted computer.

The untrusted computer sends a response packet having the source address of the untrusted computer, a destination address of the gateway, and a second payload. The gateway receiving the response packet, sends a packet having the source address of the untrusted computer and a destination address of the trusted computer and the second payload. As an advantage of the invention, this enables the trusted computer to transparently communicate with the untrusted computer.

In one aspect of the invention, the gateway includes a protocol stack. The protocol stack includes a data link layer, an Internet layer, a transport layer and an application layer. The Internet layer intercepts the packet, and diverts the packet to the transport layer. The transport layer associates the diverted packet with a proxy server operating in the application layer of the protocol stack.

DETAILED DESCRIPTION OF PREFERRED EMBODIMENT

Figure 1:
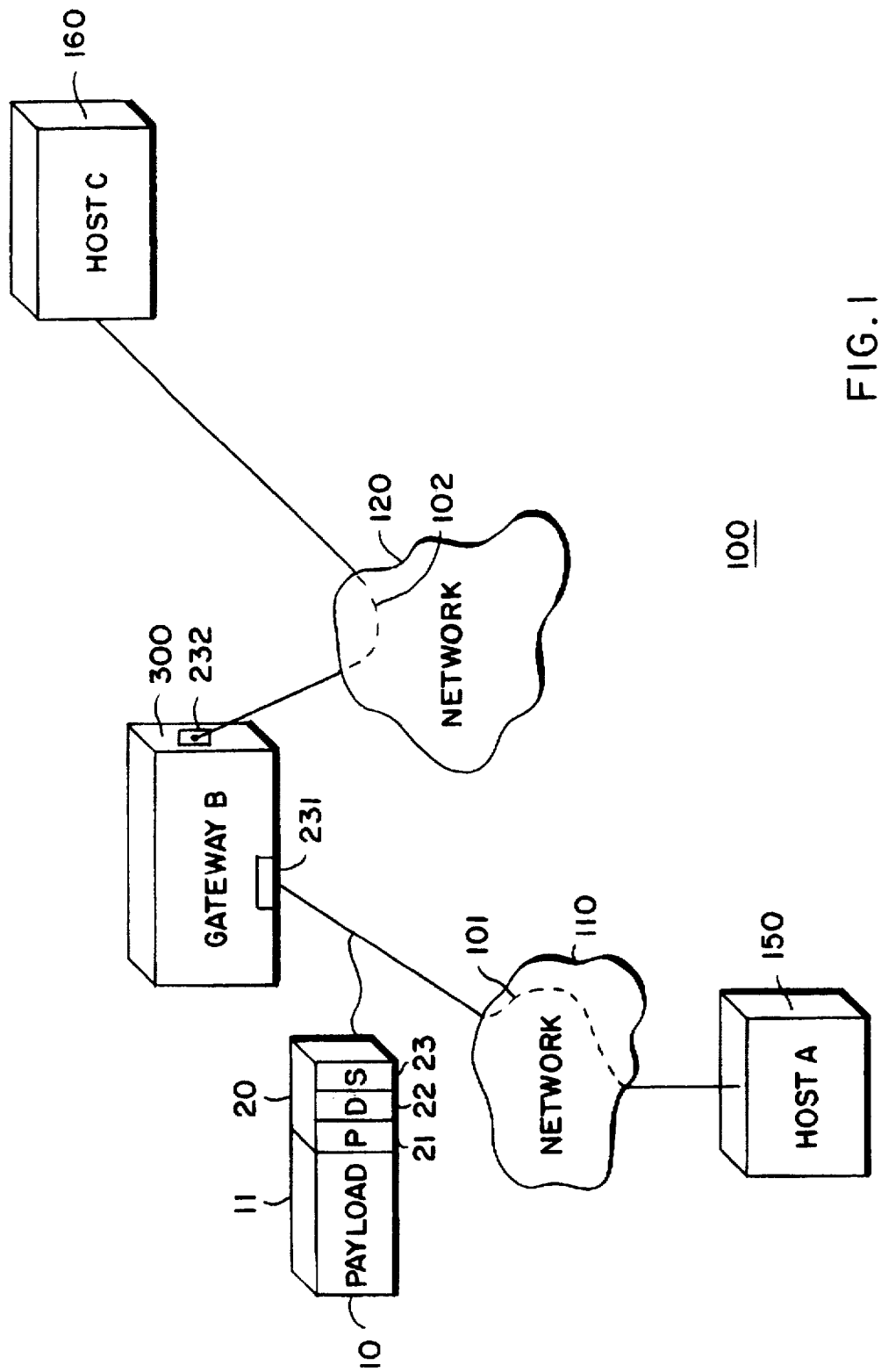
FIG. 1 is a block diagram of interconnected networks of computers using a gateway according to the invention.

FIG. 1 shows an arrangement 100 of interconnected networks of host computers, e.g., the Internet. A first network 110 is connected to a second network 120 via a gateway (B) 300. The networks 110 and 120 can include multiple links and additional gateways, and the networks can span large geographical areas. A local computer (HOST A) 150 is connected to the first network 110, and another computer (HOST C) 160 is connected to the second network 120. The network 110 and the computer 150 can be private and trusted, while the network 120 and the computer 160 can be considered untrusted and generally accessible to the public.

The computers 150 and 160 can communicate data and control information, for example packets 10, with each other using Internet protocols during sessions. Each packet 10 includes payload 11 and an Internet (IP) header 20. The header stores source address information 21, destination address information 22, and protocol control information 23 in fields. The payload 11 can be any data, including higher-level protocol headers and application data. For the purpose of this specification, it should be understood that the term packet is generically used to refer to packets as well as datagrams, and messages.

Each session exists for a period of time while the computers maintain communications state information and corresponding session control data structures in their memories. The gateway B 300 is designed according to the principles of the invention. The gateway B 300 provides a traversal scheme which combines the transparency of packet screening with the strong security features of session proxying.

The gateway 300 includes capabilities to intercept the packets 10 arriving at interfaces of the gateway. The packets 10 can be screened, and if necessary, diverted to higher layers of a local protocol stack of the gateway 300.

According to a preferred embodiment of the invention, the protocol stack of the gateway 300 includes features to transparently "proxy" packets between trusted computers and untrusted computers. In addition, the gateway's local protocol stack is configured to accept packets addressed to untrusted hosts without an overt manipulation of IP addresses, as may be required in prior art proxying schemes. Acceptable packets can be processed by a proxy server application described in greater detail below.

Furthermore, the protocol stack provides the proxy server with a means of learning the true IP addresses of end-points of a communication session traversing the gateway. Using this information, the proxy server can securely proxy sessions between trusted and untrusted end-points, as well as "spoofing" the initiating end-point of the reverse path to enable transparent forwarding.

In a preferred embodiment of the invention, the gateway B 300 is configured as a general-purpose workstation with multiple network input/output (I/O) interfaces. Since the gateway B 300 is configured as a general-purpose computer, as opposed to a dedicated Internet gateway, application-level control is facilitated, and the base operating system software can be modified to implement the invention.

Figure 2:
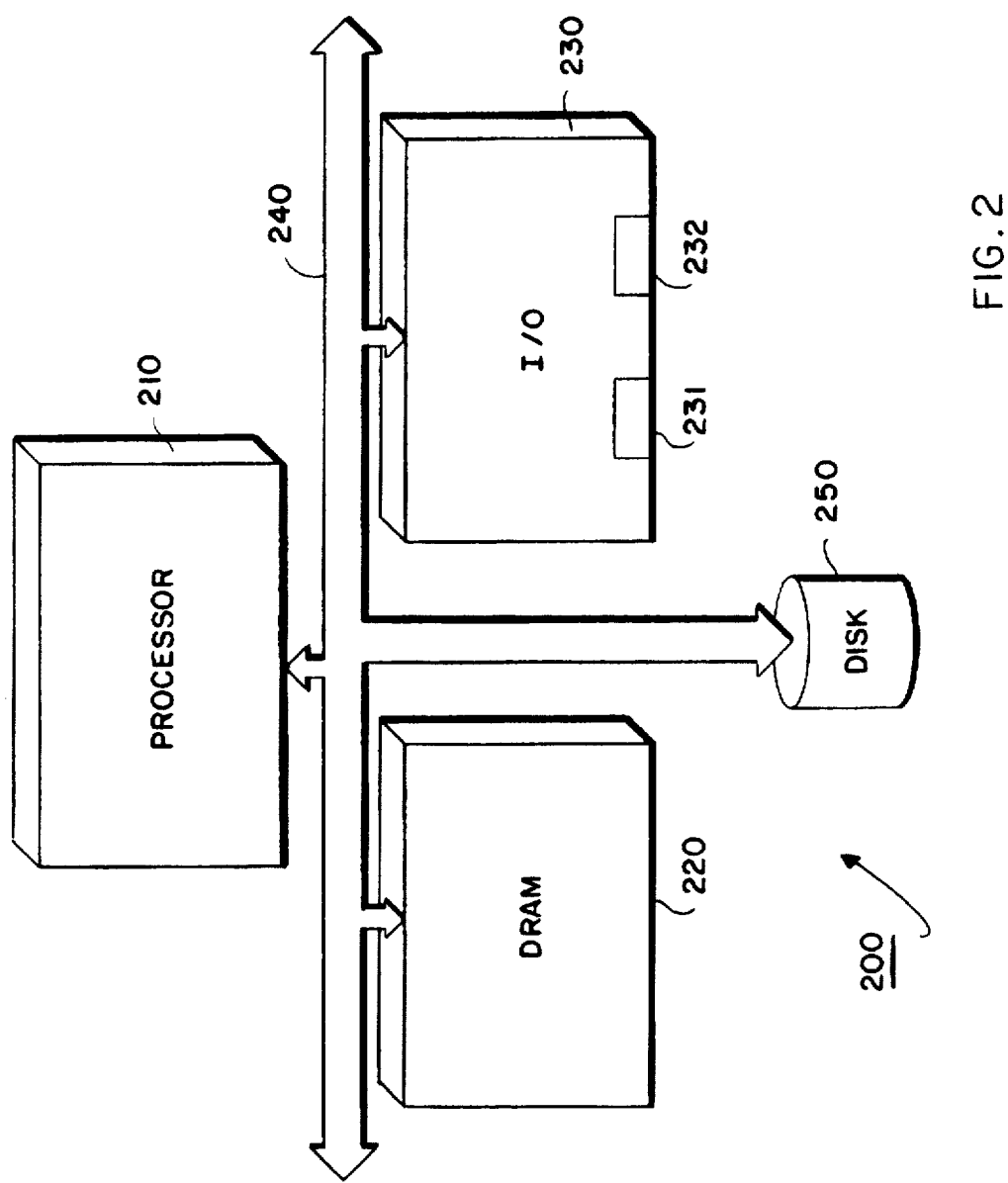
FIG. 2 is a block diagram of a workstation configured to implement the gateway of FIG. 1.

As shown in FIG. 2, the hardware of the workstation 200 includes a processor 210, a dynamic random access memory (DRAM) 220, and I/O interfaces 230 connected to each other by a bus 240. Optionally, the workstation 200 can be equipped with a disk storage sub-system 250 for the persistent storage of data and programs. In one embodiment of the invention, the processor 210 is an ALPHA processor made by Digital Equipment Corporation (DIGITAL). The I/O interfaces 230 include device drivers and hardware interfaces 231–232. The interfaces 231–232 are for physically connecting the workstation 200 to one of circuits 101–102 of the networks of FIG. 1.

During operation, the processor 210 is under the control of operating system and application software. The operating system can be, for example, the DIGITAL UNIX operating system. The DIGITAL UNIX kernel includes a derivative of the UC Berkeley 4.4 BSD networking implementation. The kernel can include both packet forwarding, and host-based Internet networking services. In essence, the kernel coordinates the control of processing of the workstation 200.

Figure 3:
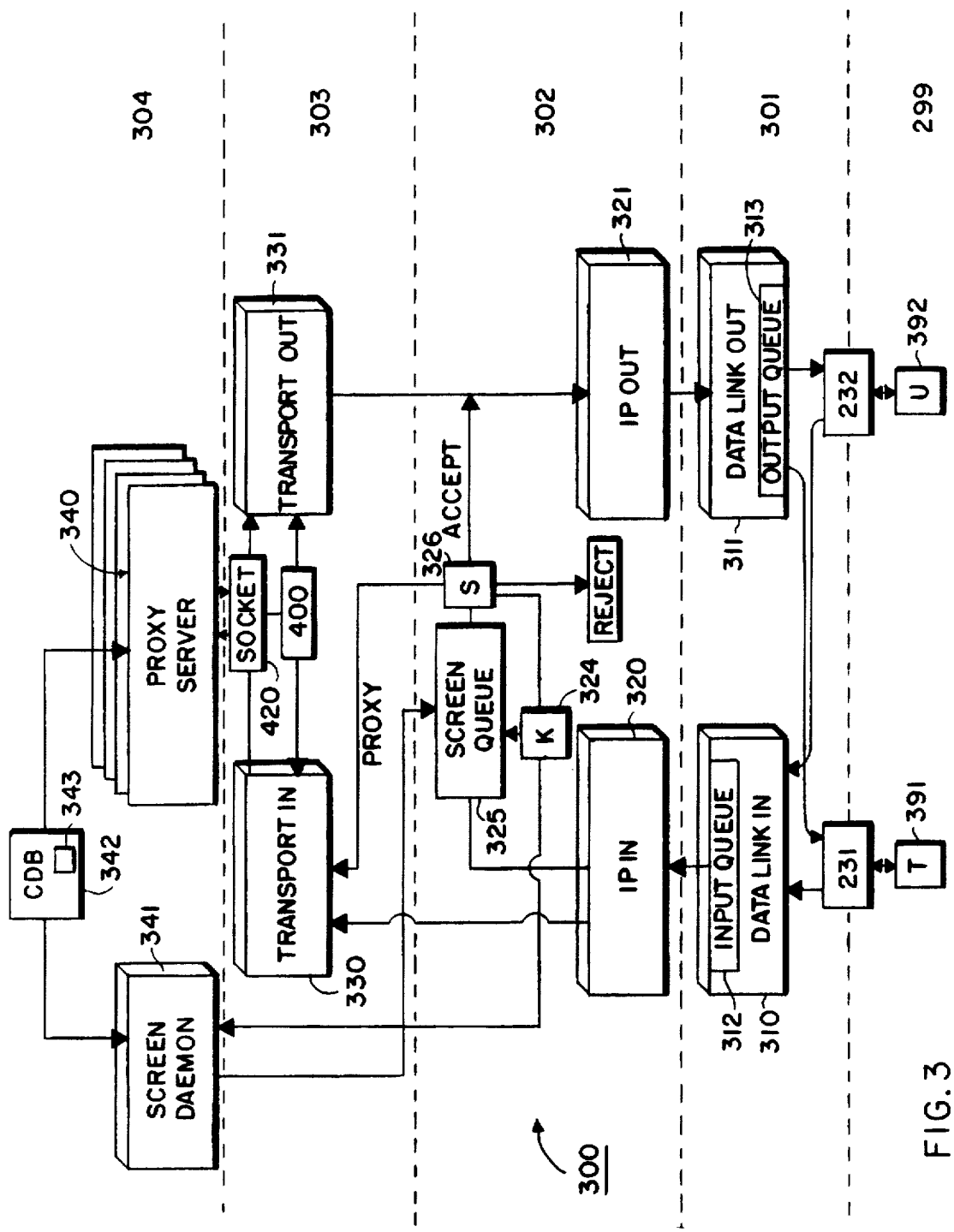
FIG. 3 is a flow diagram of the gateway according to a preferred embodiment of the invention.

Now also with reference to FIG. 3, in addition to the hardware of FIG. 2, the gateway B 300 includes processing means and session control data structures which, in part, embody the invention. For example, the gateway 300 includes means for intercepting and screening packets received at the interfaces 231–232 of the I/O interfaces 230. In addition, the gateway 300 includes means for diverting packets originating from a trusted computer and destined for an untrusted computer. The packets can be diverted to proxy servers 340 executing on the gateway 300. In addition, the proxy servers 340 can service, transparently from the viewpoint of the trusted computer, a "foreign" session. And, furthermore, the gateway 300 can "spoof" the trusted computer into believing it is communicating directly with the untrusted computer via the foreign session, rather than one of the proxy servers.

The hardware, software, and data structures of the workstation 200 of FIG. 2 are configured to enable the dissemination of routing information on trusted networks. Normally, the dissemination of trusted routing information on untrusted networks is disabled. In this way, as an advantage of the invention, the workstation 200 appears as a gateway to computers connected to trusted networks. However, to remote computers on untrusted networks, the workstation 200 appears simply as another host The gateway B 300, in part, includes a modified Internet protocol stack. A protocol stack comprises processing routines and session control data structures that coordinate the manner in which packets traverse layers of the protocol stack. The stack interfaces the gateway 300 to a physical layer 299 of the networks. The interfaces 231–232 can be viewed as straddling the physical layer 299 and the lowest level of the protocol stack. The stack includes a data link layer 301, a network/IP layer 302, a transport layer 303, and an user/application layer 304. Each of the layers 301–304 includes an input side and an output side.

At the physical to data link layer boundary, the interfaces 231 send and receive only trusted packets 391, while the interfaces 232 send and receive only untrusted packets 392. This means that the address of the interface can indicate the trustworthiness of a packet. The input side 310 of the data link layer 301 receives all packets, trusted or untrusted. Conversely, the output side 311 of the data link layer sends all packets trusted, or untrusted. The IP layer 302 includes input and output sides 320 and 321.

The packets are sent from the data link layer 301 to the IP layer 302 via the input queue 312. On the output side, the physical layers receive packets from the output queue 313. The transport layer 303 is normally configured to operate using TCP and UDP protocols.

The gateway 300 also includes application and kernel software for executing processes that interact with the data structures and hardware of the gateway 300. In a preferred embodiment of the invention, the software comprises, in part, a packet screening sub-system. The sub-system includes a screen daemon 341, and components of the kernel (K) 324. The software and hardware also use session control data structures stored in the DRAM 220 to control their operation. In addition, the software can include one or more proxy servers 340. Each of the proxy servers is associated with a port number or address. Proxy servers of the same type have the same port address.

The structure and operation of the transparently secure gateway B 300 according to the invention will now be described in order of the protocol layers.

Physical, Data Link, and IP Layer Processing

Packets 10 are received from the physical layer 299 via the interfaces 231–232. Device drivers, at the data link layer 301 place each packet on the input queue 312. An interrupt is generated for each packet so that the input side 320 of the IP layer 302 can process the packets. The destination address 22 of each packet header 20 is examined. If the destination address is local, e.g., an address assigned to the gateway B 300, the packet is presented directly to the input side 330 of the transport layer 303. From there, the packet can be directly presented to a local application. Packets destined for the foreign host C 160 on a distant network 120 outside the gateway 300 can be presented to the packet screening sub-system.

Packet Screening Sub-system

The optional packet screening sub-system provides screening capabilities for the application layer 304. The packet screening sub-system includes components of the kernel (K) 324, a screen queue 325, a switch (S) 326, and the screen daemon 341.

During operation of the gateway B 300, the kernel component 324 enqueues incoming packets (391–392) on the screen queue 325. Packets are queued from the input side of the IP layer 320. The screen daemon 341, executing at the application level 304, inspects the Internet layer addresses of the Internet protocol headers of queued packets and makes forwarding decisions based on rules 343 stored in a configuration database (CDB) 342. The CDB 342 can be stored in the disk 250 and loaded into the DRAM 220 of FIG. 2 during operation of the gateway 300.

The forwarding decisions, on a per-packet basis, determine the switching of packets by the switch 326. The screen daemon 341 supports the following possible dispositions of packets, namely, ACCEPT, REJECT, and PROXY.

The ACCEPT disposition indicates that the CDB 342 stores a rule which indicates that the packet should be forwarded. In this case, the switch 326 is directed to forward the packet to the output side 321 of the IP layer 302, and from there, via the output side 311 of the data link layer 301 to the interfaces 231 or 232 and the physical layer 299 of the networks. Conversely, a REJECT disposition indicates that there is no rule which allows the acceptance of the packet. In this case, the switch 326 is directed to reject the packet. Optionally, the kernel component 324 can also generate a control message to notify the sender of the packet that forwarding of the packet was denied.

As an advantage of the invention, the packet can also have a PROXY disposition. This disposition is as a result of the CDB 342 storing a rule which indicates that the packet needs to be proxied. The rule, for example, determines that the packet is a trusted packet 391 destined for the foreign end-point host, for example untrusted host C 160. In this case, the packet is diverted to one of the proxy servers 340. Diversion can be accomplished by marking the packet as "foreign."

Diverted packets that are marked as foreign are presented to the input side 330 of the transport layer 303. In addition, a software interrupt can be generated by the switch 326 to indicate that the foreign packet is ready for transport layer processing.

Transport Layer Processing

Figure 4:
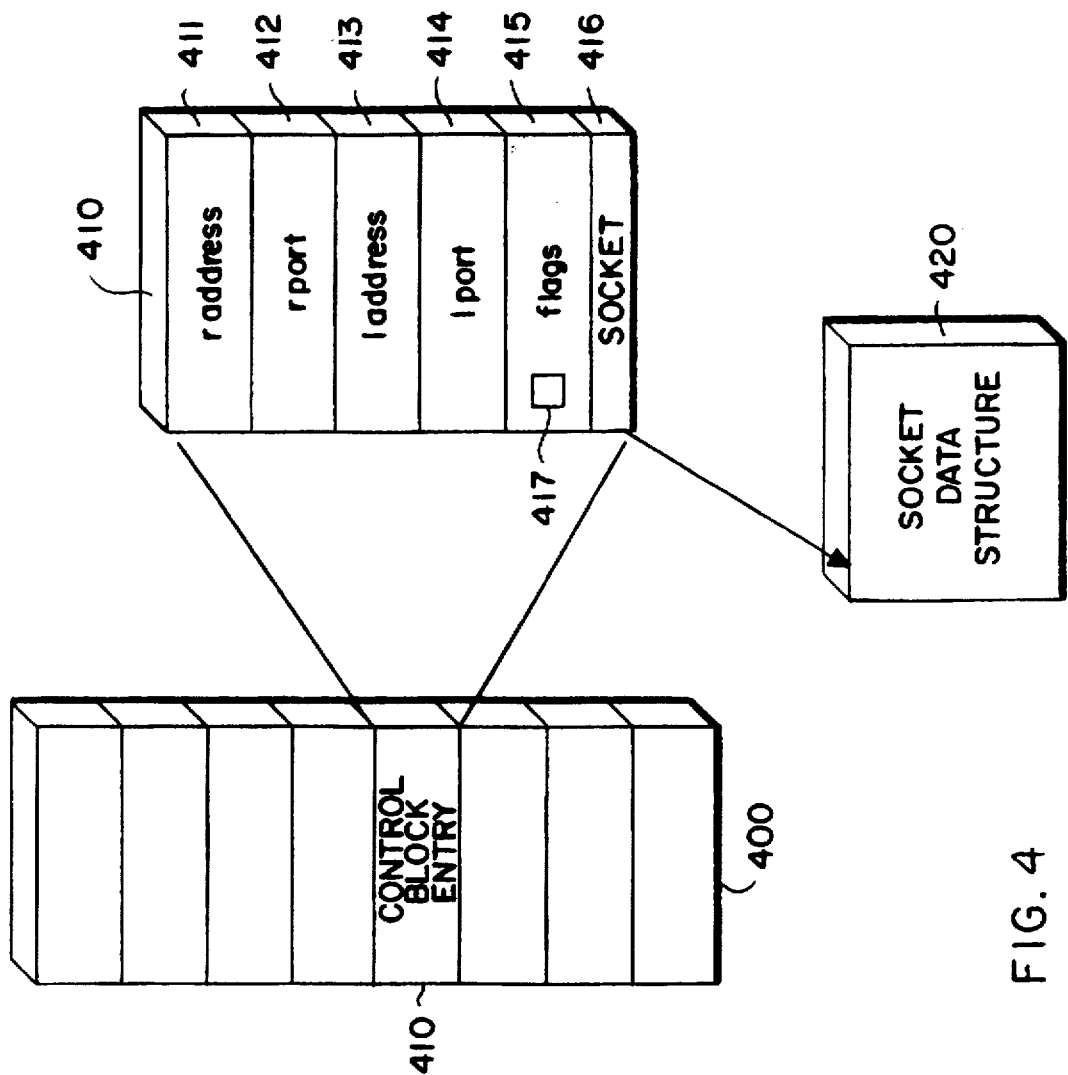
FIG. 4 is a block diagram of session control data structures used by the gateway of FIG. 3.

FIG. 4 shows a protocol control block table 400 including a plurality of session control block entries 410. Each entry 410 includes local and remote address fields which define the end-points of a current session. The address fields include remote address and port numbers (raddress, rport) 411–412, and local address and port numbers (laddress, lport) 413–414. The port numbers reference the proxy servers 340. The entry 410 also includes a flags field 415, and a socket field 416.

The transport layer 303 attempts to identify a packet with an established session. This can be done by examining the address information in the header 20 of the packet. If the packet cannot be identified with a current session, e.g., an extant control block entry 410 in the table 400, a new session can be established. A new session can only be established if address information of the packet can be identified with known address information in the control table 400, otherwise, the packet is rejected.

According to a preferred embodiment of the invention, when a new proxied "foreign" session is established, the destination address and port number of the untrusted host, as indicated in the header 20 of the packet are recorded in the laddress 413 and lport 414 fields of the entry 410. The source address and port number in the header are recorded in the raddress and rport fields 411–412. This local capturing of foreign address information, in part, enables the gateway B 300 to transparently spoof the trusted host A 150.

In traditional transport layers 303, the laddress and lport fields 413–414 of the control block entry 410 store addresses assigned to the gateway B 300 in all cases, since the IP layer 302 only forwards packets to the transport layer 303 that have an address of the gateway. The TCP/IP protocol specification, cited above, does not address the issue of processing network addresses at the transport layer 303. The transport layer 303 relies on the lower levels of the protocol stack to make network address-based forwarding decisions. Therefore, the input side 330 of the transport layer 303 would never expect to process a foreign packet.

As an advantage for the invention, the transport layer 303 is extended to accommodate this condition. Thus, a packet marked as foreign can be accepted by the transport layer 303, and passed to the application layer 304 executing one of the proxy servers 340. Therefore, the extensions to the protocol stack according to the invention allow a foreign packet to be proxied transparently without expanding the protocols beyond what is specified by the standard. Transparent proxying is enabled, in part, by creating a "foreign" protocol control block entry 410 in the table 400.

The control block entry 410 is bound to the "socket" data structure 420 by a pointer to the socket data structure 420 in the socket field 416 of the control block entry 410. The socket data structure 420 provides an interface between the kernel and the proxy server application. The socket data structure 420 contains both a packet delivery mechanism and a control mechanism. The control mechanism is used to notify the application layer 304 that a new packet is ready for processing, using, for example, software generated interrupt signals. A "proxy" flag 417 of the flags field 415 of the control block entry 410 can indicate, for example, that the application layer 304 should proxy the session.

Application Layer Processing

The proxy servers 340 of the application layer 304 interact with the kernel 324 by issuing system calls. For example, an ACCEPT system call can be used to accept a new session. In response to a session being established, the kernel returns as a reply, the address of the socket data structure 420 that was created to maintain the packet delivery and control mechanisms of the session. Also returned are the end-point addresses of the hosts A 150 and C 160 as recorded in the control block entry 410 associated with the session.

In traditional transport layers, as detailed above, the local addresses 413–414 are always associated with the gateway B itself. However, with the gateway 300 designed according to the invention, the local addresses 413–414 can reference an untrusted foreign host, such as the host C 160 of FIG. 1.

When a new session has been established, a specific one of the proxy servers 340 can be selected depending on the port address of the destination as described in the CDB 342. The proxy server 340 can next issue a system call to determine the local addresses assigned to the session. Normally, this address will reference the gateway B 300 itself. However, if the flags field 415 of the control block entry 410 is marked to indicate a proxied session, the addresses returned will reference the untrusted remote host C 160.

As an advantage of the invention, this enables the proxy server 340 to discover both the Internet address of the trusted computer A 150 as well as the Internet address of the untrusted computer C 160 without sending an inquiry to the trusted computer 150. Using the Internet address information, the proxy server 340 can establish a second session between itself and the untrusted host 160, while maintaining the initial session with the trusted host 150. This means, in contrast with prior art non-transparent proxy servers, that the proxy server 340 becomes an invisible "middleman" for packet interchange between the trusted host 150 and untrusted host C 160, with respect to the host A 150.

Figure 5:
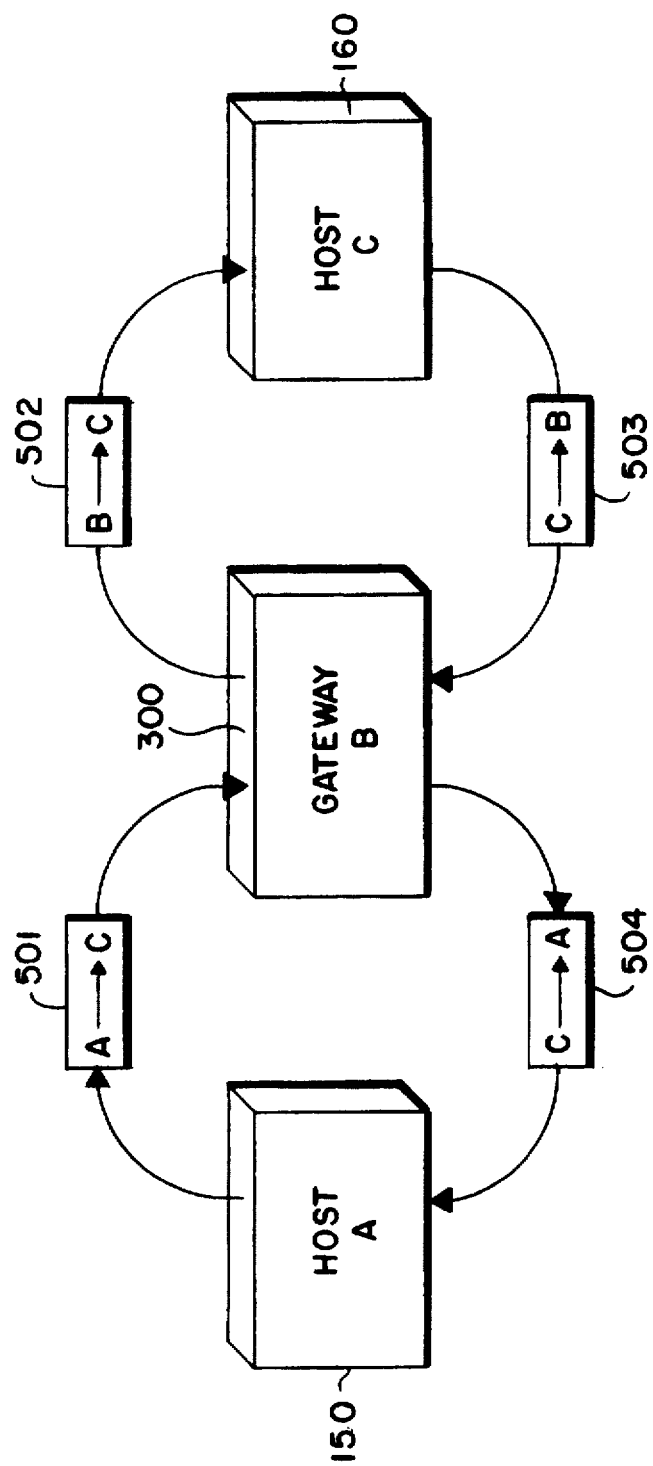
FIG. 5 is flow diagram of packets according to the invention.

The inventive interchange of packets is illustrated in FIG. 5. For clarity, the networks details are not shown. Trusted host A 150 generates a packet [A→C] 501 destined for untrusted host C 160. The gateway B 300 intercepts the packet 501, and recognizes the packet 501 as a foreign packet. The packet 501 is consumed, and the gateway B generates a new packet [B→C] 502. Host C, believing it is communicating with a "host," generates a packet [C→B] 503 in response, and never learns of the existence of host A 150. Hence, the gateway is secure.

The gateway B, knowing the session is being proxied, consumes the packet 503 and generates a new packet [C→A] 504. The host A is spoofed into believing it is directly communicating with host C. Thus, as an advantage of the invention, the host A does not need to be aware that it is communicating via a proxy server. Hence, the gateway is transparent.

Furthermore, as a rule option, the proxy server 340 can expose the Internet address of the trusted host 150 to the untrusted host 160. Alternatively, the proxy server 340 can hide this information. Additionally, the gateway 300, according to the invention, can support both transparent and non-transparent operations, since flags field 415 of the control block entry 410 of the session indicates the correct mode of operation.

However, since the local address associated with the socket is actually the Internet address of the untrusted host C 160, in the case of a proxied session, the proxy application 340 can spoof the trusted host 150 into believing it is communicating directly with the untrusted host 160 simply by communicating via the second session. This spoofing maintains transparency from the viewpoint of the local host 150.

With the extensions to the transport layer 303, as disclosed herein, the gateway 300 can generate packets, e.g., packet 504, with an Internet source address of the untrusted host 160 and an Internet destination address of the trusted host A 150, even though the packets were initially generated locally by the gateway B 300. This is due, in part, to the fact that foreign addressing information is recorded in the session control block entries 410, according to the invention, as a local addresses.

The gateway 300 as described herein allows both transparent and non-transparent gateway traversal. The processes and data structures described herein can be incorporated into traditional gateway infrastructures without requiring costly modifications of application software, and significant retraining for the user community.

The gateway 300, as described, does not require any modifications of trusted and untrusted hosts, and can enable implementations of constrained client applications, such as those implemented on small PCs. Many PC-based client applications are not capable of operation in a non-transparent proxy manner with prior art gateways. Additionally, the gateway 300 can be implemented on a single and simple general-purpose UNIX workstation, as opposed to the multiple-box configurations required in many traditional approaches.

The exemplary preferred embodiment described here has focused on the case of a trusted host initiating a session with an untrusted host. The reverse is also possible. However, in this case, trusted Internet addresses may need to be advertised in routing updates on the untrusted portion of the Internet.

In addition, the present design implements the gateway on a single workstation. However, in alternative embodiments, the gateway can coexist with other gateway traversal schemes using perhaps multiple workstations.

Performance of the gateway can be improved if a kernel memory cache is added to the packet screening sub-system to eliminate per-packet context switches. Alternatively, the entire packet screening sub-system can be implemented in kernel mode to eliminate packet screening context switching in all cases. Furthermore, the packet screening sub-system can be bypassed. In this scheme, foreign packets are always proxied. This sacrifices fine-grained screening capabilities for better performance.

The principles of the invention have been described with respect to specific embodiments. It will be apparent to those skilled in the art that various modifications can be made to the embodiments shown. Therefore, the spirit and scope of the invention are set out in the appended claims.

We claim:

1. A computer implemented method for communicating packets between a trusted computer and an untrusted computer connected by a gateway having a gateway address, each packet including a source address, a destination address and a payload, comprising the steps of:

receiving in the gateway, a first packet having a source address of the trusted computer, the destination address, and a first payload and excluding the gateway address; and in response sending, from the gateway, a second packet having a source address of the gateway, a destination address of the untrusted computer and the first payload unchanged, if the first packet has the destination address of the untrusted computer to enable the trusted computer to securely communicate with the untrusted computer.

2. The method of claim 1 wherein the gateway includes a protocol stack, the protocol stack including a data link layer, an Internet layer, a transport layer, and an application layer, and further comprising:

intercepting the first packet in the Internet layer;

diverting the first packet through a transport layer to a proxy server operating in the application layer; and consuming the first packet while generating the second packet.

3. The method of claim 1 wherein the gateway includes a plurality of rules stored as a configuration database in a memory of the gateway, and wherein the plurality of rules includes a first rule for recognizing the destination address of the untrusted computer.

4. The method of claim 3 further including a screening sub-system and wherein the configuration database includes a second rule to screen the first packet, and further comprising:

accepting the first packet for proxying if the source address and the destination address comply with the second rule.

5. The method of claim 1 wherein the gateway includes a session control table having at least one entry to control the communication of packets between the trusted computer and the untrusted computer, the entry including a local address field and a remote address field, and further comprising:

storing the address of the untrusted computer in the local address field; and storing the address of the trusted computer in the remote address field to spoof the trusted computer into believing that the trusted computer is communicating directly with the untrusted computer.

6. The method of claim 5 wherein the session control table includes a flags field, and further comprising:

marking the flags field to indicate that the gateway is proxying a foreign session on behalf of the trusted computer;

establishing the foreign session between the gateway and the untrusted computer.

7. A computer implemented method for communicating packets between a trusted computer and an untrusted computer connected by a gateway having a gateway address, each packet including a source address, a destination address and a payload, comprising the steps of:

receiving, in the gateway, a first packet having a source address of the trusted computer, the destination address, and a first payload and excluding the gateway address;

sending, from the gateway, a second packet having a source address of the gateway, a destination address of the untrusted computer and the first payload if the first packet has the destination address of the untrusted computer to enable the trusted computer to securely communicate with the untrusted computer and further;

receiving, in the gateway, a third packet responsive to the second packet, the third packet having the source address of the untrusted computer, the destination address, and a second payload; and in response sending, from the gateway, a fourth packet having the source address of the untrusted computer, a destination address of the trusted computer and the second payload if the third packet has a destination address of the gateway to enable the untrusted computer to communicate transparently with the trusted computer.

8. An apparatus for communicating packets between a trusted computer and an untrusted computer connected by a gateway, each packet including a source address, a destination address and a payload, comprising:

a data link layer of a protocol stack, the data link layer to receive a first packet having a source address of the trusted computer, a destination address, and a first payload;

an Internet layer of the protocol stack, the Internet layer to intercept the first packet from the data link layer if the first packet has a destination address of the untrusted computer;

a transport layer of the protocol stack, the transport layer to divert the intercepted first packet to a proxy server;

an application layer executing the proxy server, the proxy server to generate a second packet having a source address of the gateway and the destination address of the untrusted computer and the first payload;

means for sending the second packet to the untrusted computer to enable the trusted computer to securely communicate with the untrusted computer;

means for receiving, in the gateway, a third packet responsive to the second packet, the third packet having the source address of the untrusted computer, the destination address, and a second payload; and in response sending, from the gateway, a fourth packet having the source address of the untrusted computer, a destination address of the trusted computer and the second payload if the third packet has a destination address of the gateway to enable the untrusted computer to communicate transparently with the trusted computer.

9. A computer implemented method for communicating packets between a trusted computer and an untrusted computer connected by a gateway, each packet including a source address, a destination address and a payload, comprising the steps of:

receiving, in the gateway, a first packet having a source address of the trusted computer, the destination address, and a first payload; and in response sending, from the gateway, a second packet having a source address of the gateway, a destination address of the untrusted computer and the first payload if the first packet has the destination address of the untrusted computer to enable the trusted computer to securely communicate with the untrusted computer; and upon receipt of packets in said gateway from said untrusted computer forwarding said packets to said trusted computer by replacing the destination address in said packet from said gateway address to said trusted computer address.

10. An apparatus for communicating packets between a trusted computer and an untrusted computer connected by a gateway, each packet including a source address, a destination address and a payload, comprising:

a data link layer of a protocol stack, the data link layer to receive a first packet having a source address of the trusted computer, a destination address, and a first payload;

an Internet layer of the protocol stack, the Internet layer to intercept the first packet from the data link layer if the first packet has a destination address of the untrusted computer;

a transport layer of the protocol stack, the transport layer to divert the intercepted first packet to a proxy server;

an application layer executing the proxy server, the proxy server to generate a second packet having a source address of the gateway and the destination address of the untrusted computer and an unchanged first payload;

means for sending the second packet to the untrusted computer to enable the trusted computer to securely communicate with the untrusted computer.

11. A computer implemented method for communicating packets between a trusted computer and an untrusted computer connected by a gateway having a session control table with a first entry, the first entry including a local address field and a remote address field, each packet including a source address, a destination address and a payload, the method comprising the steps of:

receiving, in the gateway, a first packet having a source address of the trusted computer, the destination address, and a first payload;

storing the address of the untrusted computer in the local address field; and sending, from the gateway, a second packet having a source address of the gateway, a destination address of the untrusted computer and the first payload unchanged, if the first packet has the destination address of the untrusted computer to enable the trusted computer to securely communicate with the untrusted computer.

12. The method of claim 11, wherein the gateway includes a protocol stack, the protocol stack including a data link layer, an Internet layer, a transport layer, and an application layer, and further comprising:

intercepting the first packet in the Internet layer;

diverting the first packet through a transport layer to a proxy server operating in the application layer; and consuming the first packet while generating the second packet.

13. The method of claim 11, wherein the gateway includes a plurality of rules stored as a configuration database in a memory of the gateway, and wherein the plurality of rules includes a first rule for recognizing the destination address of the untrusted computer.

14. The method of claim 13, further including a screening sub-system and wherein the configuration database includes a second rule to screen the first packet, and further comprising:

accepting the first packet for proxying if the source address and the destination address comply with the second rule.

15. The method of claim 11, wherein the session control table includes a flags field, and further comprising:

marking the flags field to indicate that the gateway is proxying a foreign session on behalf of the trusted computer;

establishing the foreign session between the gateway and the untrusted computer.

* * * * *